United States Patent
Terasaka et al.

(10) Patent No.: US 12,325,401 B2
(45) Date of Patent: Jun. 10, 2025

(54) BRAKING CONTROL DEVICE FOR VEHICLE

(71) Applicant: ADVICS CO., LTD., Kariya (JP)

(72) Inventors: Masato Terasaka, Kariya (JP); Chisa Kitahara, Kariya (JP)

(73) Assignee: ADVICS CO., LTD., Kariya (JP)

( * ) Notice: Subject to any disclaimer, the term of this patent is extended or adjusted under 35 U.S.C. 154(b) by 373 days.

(21) Appl. No.: 17/778,984

(22) PCT Filed: Nov. 25, 2020

(86) PCT No.: PCT/JP2020/043724
§ 371 (c)(1),
(2) Date: May 23, 2022

(87) PCT Pub. No.: WO2021/106895
PCT Pub. Date: Jun. 3, 2021

(65) Prior Publication Data
US 2022/0410855 A1 Dec. 29, 2022

(30) Foreign Application Priority Data
Nov. 25, 2019 (JP) .................. 2019-212572

(51) Int. Cl.
*B60T 8/1761* (2006.01)
*B60T 8/172* (2006.01)
*B60T 8/1769* (2006.01)

(52) U.S. Cl.
CPC .......... *B60T 8/17616* (2013.01); *B60T 8/172* (2013.01); *B60T 8/1769* (2013.01); *B60T 2250/04* (2013.01); *B60T 2270/12* (2013.01)

(58) Field of Classification Search
CPC .... B60T 8/172; B60T 8/1769; B60T 2250/04; B60T 2270/12
See application file for complete search history.

(56) References Cited

U.S. PATENT DOCUMENTS

2009/0043466 A1 * 2/2009 Nakai .................. B60W 30/19
701/55

FOREIGN PATENT DOCUMENTS

| JP | H0427648 A | * | 1/1992 | |
| JP | H09286315 A | | 11/1997 | |
| JP | 3653163 B2 | * | 5/2005 | .......... B60T 8/17616 |

OTHER PUBLICATIONS

English Machine Translation of JPH0427648A (Year: 1992).*
English Machine Translation of JP-3653163-B2 (Year: 2005).*

* cited by examiner

*Primary Examiner* — Andrew J Cromer
(74) *Attorney, Agent, or Firm* — BUCHANAN INGERSOLL & ROONEY PC

(57) ABSTRACT

A braking control device includes: a wheel deceleration deriving section that derives decrease rates of wheel speed detection values as wheel deceleration calculation values; an average value deriving section that derives an average value of the wheel deceleration calculation values of wheels FL, FR, RL, and RR as a wheel deceleration average value; a determination section that determines, based on the wheel deceleration average value and an anteroposterior deceleration detection value, whether or not a slip increase state has been occurring for a determination time or longer; and a detection section that detects occurrence of cascade lock when it is determined that the slip increase state has been occurring for the determination time or longer during vehicle braking.

4 Claims, 5 Drawing Sheets

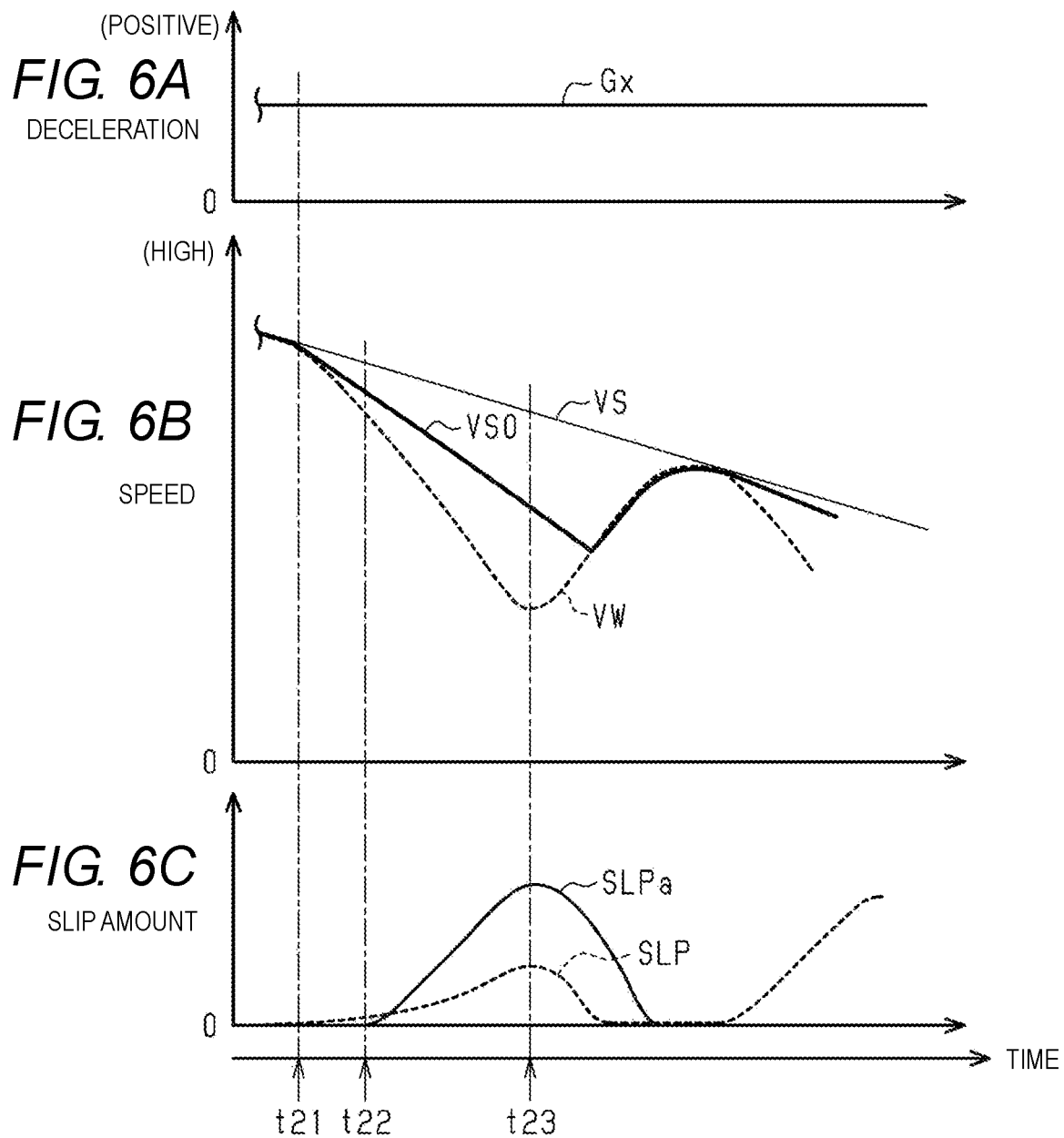

BRAKING CONTROL DEVICE FOR VEHICLE

TECHNICAL FIELD

The present disclosure relates to a vehicle braking control device.

BACKGROUND ART

Patent Literature 1 describes an example of a braking control device that performs determination processing to determine whether or not a vehicle is traveling on a low μ road. In the braking control device, during vehicle braking based on braking operation by the driver of the vehicle, when both the vehicle body speed of the vehicle is lower than a determined speed and the wheel speed difference between a drive wheel and a driven wheel is equal to or greater than a determined speed difference, it is determined that the vehicle is traveling on a low μ road.

The vehicle body speed is derived based on at least one of the wheel speeds of the wheels.

CITATIONS LIST

Patent Literature

Patent Literature 1: JP H09-286315 A

SUMMARY

Technical Problems

When braking is performed in a four-wheel drive vehicle traveling on a low p road, cascade lock may occur which is a phenomenon in which a predetermined deceleration slip occurs in all the wheels. When cascade lock occurs, the wheel speeds of all the wheels decrease more rapidly than the deceleration of the vehicle body, and thus the vehicle body speed cannot be appropriately derived. In addition, the wheel speed difference between the front wheels and the rear wheels does not increase. As a result, it cannot be determined that the vehicle is traveling on a low μ road. Therefore, a technique for detecting the occurrence of cascade lock during braking in a four-wheel drive vehicle is desired.

Solutions to Problems

A vehicle braking control device for solving the above problems is applied to a vehicle including a plurality of wheels, a plurality of wheel speed sensors that output a detection signal according to a wheel speed that is a speed of a corresponding wheel, and an anteroposterior acceleration sensor that outputs a detection signal according to an anteroposterior acceleration of the vehicle. It is assumed that a deceleration of the vehicle in an anteroposterior direction derived based on the detection signal of the anteroposterior acceleration sensor is an anteroposterior deceleration detection value, decrease rates of the wheel speeds are wheel decelerations, and wheel speeds derived based on the detection signals of the wheel speed sensors are wheel speed detection values. In this case, the braking control device includes: a wheel deceleration deriving section that derives decrease rates of the wheel speed detection values as wheel deceleration calculation values; an average value deriving section that derives an average value of the wheel deceleration calculation values of the wheels as a wheel deceleration average value; a determination section that determines, based on the wheel deceleration average value and the anteroposterior deceleration detection value, whether or not a slip increase state, in which an increase rate of the average value of the wheel decelerations of the respective wheels is higher than an increase rate of the deceleration of the vehicle in the anteroposterior direction, has been occurring for a determination time or longer; and a detection section that detects occurrence of cascade lock when it is determined that the slip increase state has been occurring for the determination time or longer during vehicle braking.

When cascade lock occurs during vehicle braking, the increase rate of the average value of the wheel decelerations of all the wheels increases and the increase rate of the average value continues to be high as compared with a case where deceleration slip occurs only in some of the wheels. Therefore, in the above configuration, it is determined whether or not a slip increase state has been occurring for the determination time or longer based on the wheel deceleration average value and the anteroposterior deceleration detection value. Then, the occurrence of cascade lock is detected when it is determined that the slip increase state has been occurring for the determination time or longer during vehicle braking.

That is, according to the above configuration, the occurrence of cascade lock can be detected during vehicle braking.

BRIEF DESCRIPTION OF DRAWINGS

FIGS. 6A, 6B, and 6C are timing charts in a case where anti-lock brake control is started during occurrence of cascade lock.

DESCRIPTION OF EMBODIMENT

The following describes an embodiment of a vehicle braking control device according to FIGS. 1 to 6C.

Figure 1:
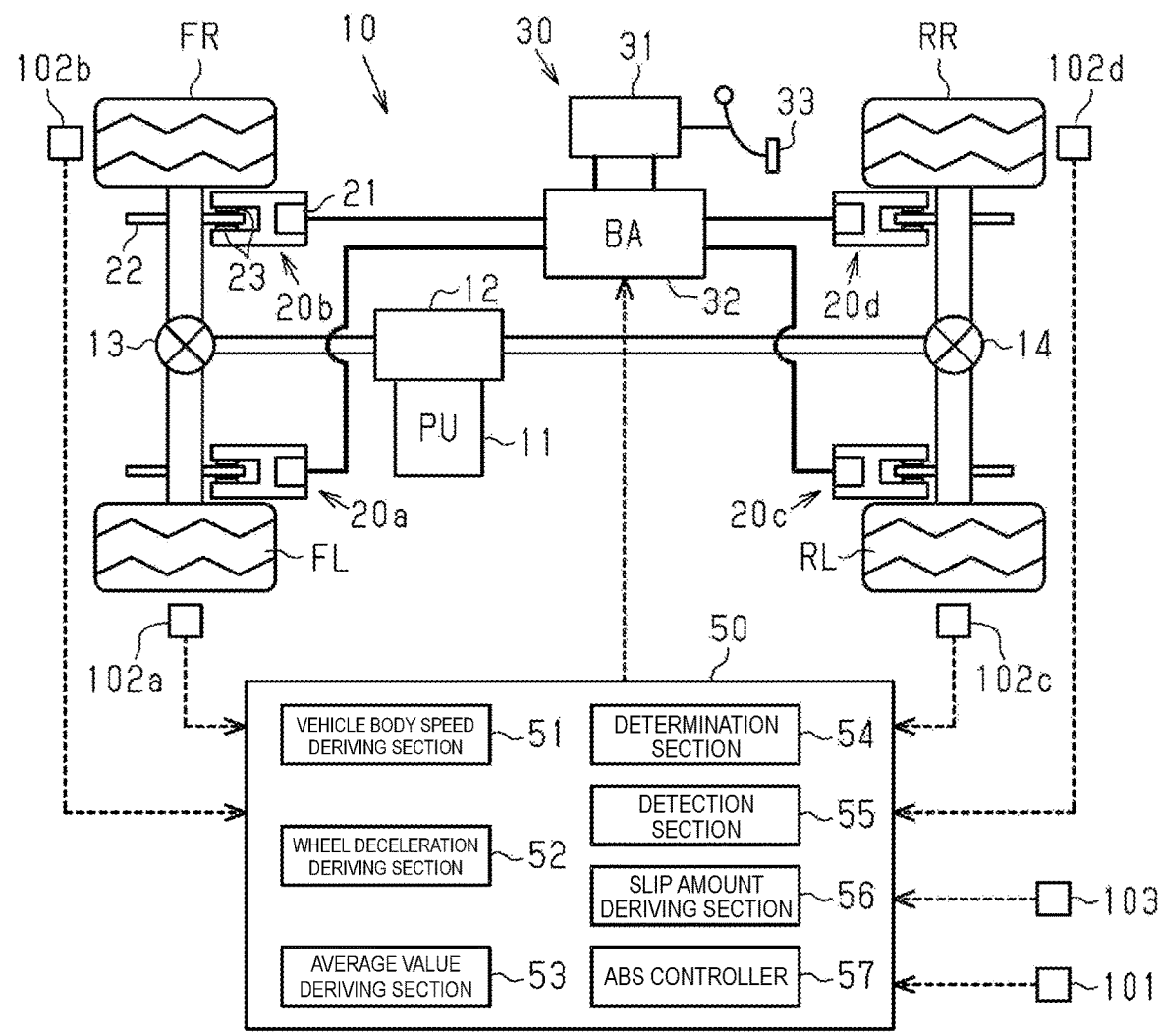
FIG. 1 is a diagram illustrating a functional configuration of a vehicle braking control device according to an embodiment and a schematic configuration of a vehicle including the braking control device.

FIG. 1 illustrates a vehicle 10 including a braking control device 50 of the present embodiment. The vehicle 10 includes a front left wheel FL, a front right wheel FR, a rear left wheel RL, and a rear right wheel RR as wheels. The vehicle 10 is a four-wheel drive vehicle in which all the wheels FR, FL, RR, and RL function as drive wheels. Driving force output from a drive device 11 of the vehicle 10 is input to a center differential 12. The driving force input to the center differential 12 is distributed to a front differential 13 side and a rear differential 14 side. The driving force input to the front differential 13 is distributed to the front left wheel FL and the front right wheel FR. The driving force input to the rear differential 14 is distributed to the rear left wheel RL and the rear right wheel RR by the rear differential 14.

The vehicle 10 is provided with individual braking mechanisms 20a, 20b, 20c, and 20d for the respective wheels FL, FR, RL, and RR. Each of the braking mechanisms 20a to 20d includes a rotating body 22 that rotates integrally with the corresponding one of the wheels FL, FR, RL, and RR, and a friction material 23 which is pressed against the rotating body 22. The force pressing the friction material 23 against the rotating body 22 increases as hydraulic pressure in a wheel cylinder 21 increases. As the force pressing the friction material 23 against the rotating body 22 increases, the braking force on each of the wheels FL, FR, RL, and RR increases.

A braking device 30 of the vehicle 10 includes a hydraulic pressure generating device 31 and a braking actuator 32. When a brake operation member 33 such as a brake pedal is operated by a driver, the hydraulic pressure generating device 31 generates hydraulic pressure according to the amount of operation. When the driver performs braking operation, an amount of brake fluid corresponding to the hydraulic pressure generated by the hydraulic pressure generating device 31 is supplied into each wheel cylinder 21. From this, braking force is applied to the wheels FL, FR, RL, and RR. The braking actuator 32 can individually adjust the hydraulic pressure in each wheel cylinder 21 under the control of the braking control device 50. That is, the braking force applied to each of the wheels FL, FR, RL, and RR can be individually adjusted by the actuation of the braking actuator 32.

Next, the braking control device 50 is described.

Detection signals from various sensors are input to the braking control device 50. Examples of the sensors can include a brake switch 101, wheel speed sensors 102a, 102b, 102c, and 102d, and an anteroposterior acceleration sensor 103. The brake switch 101 detects whether or not the brake operation member 33 is being operated, and outputs a signal corresponding to the detection result as a detection signal. The wheel speed sensors 102a to 102d are provided for the respective wheels FL, FR, RL, and RR. The wheel speed sensors 102a to 102d detect wheel speeds which are speeds of the corresponding wheels FL, FR, RL, and RR, and output signals corresponding to the detection results as detection signals. The anteroposterior acceleration sensor 103 detects an anteroposterior acceleration, which is an acceleration in the anteroposterior direction of the vehicle 10, and outputs a signal corresponding to the detection result as a detection signal.

In the following description, the wheel speeds of the wheels FL, FR, RL, and RR derived by the braking control device 50 based on the detection signals from the wheel speed sensors 102a to 102d are referred to as "wheel speed detection values VW". Deceleration in the anteroposterior direction of the vehicle 10 derived by the braking control device 50 based on the detection signal from the anteroposterior acceleration sensor 103 is referred to as an "anteroposterior deceleration detection value Gx". Note that when the vehicle 10 decelerates while moving forward, the anteroposterior deceleration detection value Gx increases as the deceleration increases. By contrast, when the vehicle 10 accelerates while moving forward, the anteroposterior deceleration detection value Gx decreases as the acceleration increases. For example, when the vehicle 10 accelerates on a flat road, the anteroposterior deceleration detection value Gx is negative, and the absolute value of the anteroposterior deceleration detection value Gx increases as the acceleration of the vehicle 10 increases. That is, the product of "−1" and the anteroposterior acceleration of the vehicle 10 derived based on the detection signal from the anteroposterior acceleration sensor 103 can be derived as the anteroposterior deceleration detection value Gx. Note that in the braking control device 50, an increase rate DGx of the anteroposterior deceleration detection value Gx is derived by time-differentiating the anteroposterior deceleration detection value Gx. The increase rate DGx of the anteroposterior deceleration detection value Gx is also referred to as an increasing gradient of the anteroposterior deceleration detection value Gx.

The braking control device 50 includes, as functional sections, a vehicle body speed deriving section 51, a wheel deceleration deriving section 52, an average value deriving section 53, a determination section 54, a detection section 55, a slip amount deriving section 56, and an ABS controller 57.

The vehicle body speed deriving section 51 derives an estimated vehicle body speed VS0, which is an estimated value of the vehicle body speed of the vehicle 10, based on the wheel speed detection value VW of at least one of the wheels FL, FR, RL, and RR. In the present embodiment, the vehicle body speed deriving section 51 derives an estimated vehicle body speed VS0 every predetermined control cycle. A previously derived estimated vehicle body speed VS0 is set as a previous value VS0(N-1) of the estimated vehicle body speed, and a currently derived estimated vehicle body speed VS0 is set as a latest value VS0(N) of the estimated vehicle body speed. A value obtained by time-differentiating the wheel speed detection value VW is referred to as a "wheel speed differential value ΔVW". In this case, the vehicle body speed deriving section 51 derives the sum of the previous value VS0(N-1) of the estimated vehicle body speed and the wheel speed differential value ΔVW as the latest value VS0(N) of the estimated vehicle body speed. As such, when the wheel speed detection value VW is increasing, the wheel speed differential value ΔVW becomes positive and thus the estimated vehicle body speed VS0 increases. By contrast, when the wheel speed detection value VW is decreasing, the wheel speed differential value ΔVW becomes negative and thus the estimated vehicle body speed VS0 decreases.

However, when deriving the latest value VS0(N) of the estimated vehicle body speed, a predetermined upper limit guard and lower limit guard are set. That is, when the wheel speed differential value ΔVW is greater than the upper limit guard, the vehicle body speed deriving section 51 derives the sum of the upper limit guard and the previous value VS0 (N-1) of the estimated vehicle body speed as the latest value VS0(N) of the estimated vehicle body speed. By contrast, when the wheel speed differential value ΔVW is smaller than the lower limit guard, the vehicle body speed deriving section 51 derives the sum of the lower limit guard and the previous value VS0(N-1) of the estimated vehicle body speed as the latest value VS0(N) of the estimated vehicle body speed.

The wheel deceleration deriving section 52 derives a wheel deceleration calculation value DVW of each of the wheels FL, FR, RL, and RR. That is, the wheel deceleration deriving section 52 derives a decrease rate of the wheel speed detection value VW as the wheel deceleration calculation value DVW. For example, the wheel deceleration deriving section 52 derives the product of "−1" and a value obtained by time-differentiating the wheel speed detection value VW as the wheel deceleration calculation value DVW.

The average value deriving section 53 derives an average value of the wheel deceleration calculation values DVW of the wheels FL, FR, RL, and RR as a wheel deceleration average value DVWav. In addition, the average value deriving section 53 derives an increase rate DDVWav of the wheel deceleration average value DVWav by time-differentiating the wheel deceleration average value DVWav. The increase rate DDVWav of the wheel deceleration average value DVWav is also referred to as an increasing gradient of the wheel deceleration average value DVWay.

The determination section 54 determines whether or not a slip increase state has been occurring for a determination time TMcr or longer based on the wheel deceleration average value DVWav and the anteroposterior deceleration detection value Gx. The slip increase state is a state in which the increase rate of the average value of the wheel deceleration of each of the wheels FL, FR, RL, and RR is higher than the increase rate of the deceleration of the vehicle 10 in the anteroposterior direction. Specific contents of determination processing are described later.

The detection section 55 detects the occurrence of cascade lock when it is determined that the slip increase state has been occurring for the determination time TMcr or longer during vehicle braking. Cascade lock is a phenomenon in which a predetermined deceleration slip occurs in any drive wheel to which the driving force of the drive device 11 is input. In the vehicle 10, all the wheels FL, FR, RL, and RR are drive wheels. Therefore, a state in which the predetermined deceleration slip is occurring in any of the wheels FL, FR, RL, and RR is cascade lock.

The slip amount deriving section 56 derives a slip amount SLPa of each of the wheels FL, FR, RL, and RR after the detection section 55 detects the occurrence of cascade lock. The slip amounts SLPa are degrees of deceleration slip of the wheels FL, FR, RL, and RR. Derivation processing of a slip amount SLPa is described later.

After the detection section 55 detects the occurrence of cascade lock, the ABS controller 57 starts anti-lock brake control to suppress the deceleration slip of the wheels FL, FR, RL, and RR through adjustment of the braking force applied to the wheels FL, FR, RL, and RR on the condition that a slip amount SLPa derived by the slip amount deriving section 56 increases. Processing to determine the start of anti-lock brake control is described later. In the following description, anti-lock brake control is referred to as "ABS control".

Next, a processing routine performed by the determination section 54 to determine whether or not a slip increase state has been occurring for the determination time TMcr or longer is described with reference to FIG. 2. The processing routine is repeatedly performed every predetermined control cycle.

In the processing routine, in Step S11, it is determined whether or not the anteroposterior deceleration detection value Gx is greater than an anteroposterior deceleration determination value GxTh. The anteroposterior deceleration determination value GxTh is set as a criterion for determining whether or not the vehicle 10 is decelerating due to vehicle braking. When the anteroposterior deceleration detection value Gx is equal to or smaller than the anteroposterior deceleration determination value GxTh (S11: NO), it cannot be determined that the vehicle 10 is decelerating due to vehicle braking, and thus the processing proceeds to Step S18. When the anteroposterior deceleration detection value Gx is greater than the anteroposterior deceleration determination value GxTh by contrast (S11: YES), it can be determined that the vehicle 10 is decelerating due to vehicle braking, and thus the processing proceeds to Step S12.

In Step S12, when a value obtained by subtracting the increase rate DGx of the anteroposterior deceleration detection value from the increase rate DDVWav of the wheel deceleration average value is set as a derived difference DD1, it is determined whether or not the derived difference DD1 is greater than a first derived difference determination value DDTh1. The derived difference DD1 is an example of a deviation. The first derived difference determination value DDTh1 is set as a criterion for determining whether or not the increase rate DDVWav of the wheel deceleration average value is higher than the increase rate DGx of the anteroposterior deceleration detection value. For example, "0" or a value greater than "0" may be set as the first derived difference determination value DDTh1.

In Step S12, when the derived difference DD1 is greater than the first derived difference determination value DDTh1 (YES), it can be determined that the increase rate DDVWav of the wheel deceleration average value is higher than the increase rate DGx of the anteroposterior deceleration detection value, and thus the processing proceeds to Step S13. In Step S13, a counter value CNT is incremented by "1". The processing then proceeds to Step S16. By contrast, in Step S12, when the derived difference DD1 is equal to or smaller than the first derived difference determination value DDTh1 (NO), it cannot be determined that the increase rate DDVWav of the wheel deceleration average value is higher than the increase rate DGx of the anteroposterior deceleration detection value, and thus the processing proceeds to Step S14.

In Step S14, it is determined whether or not the derived difference DD1 is equal to or smaller than a second derived difference determination value DDTh2. The second derived difference determination value DDTh2 is set as a criterion for determining whether or not the increase rate DDVWav of the wheel deceleration average value is equal to or lower than the increase rate DGx of the anteroposterior deceleration detection value. A value smaller than the first derived difference determination value DDTh1 is set as the second derived difference determination value DDTh2. When a value greater than "0" is set as the first derived difference determination value DDTh1, it is desirable to set a value equal to or greater than "0" as the second derived difference determination value DDTh2. When the derived difference DD1 is equal to or smaller than the second derived difference determination value DDTh2 (S14: YES), it can be determined that the increase rate DDVWav of the wheel deceleration average value is equal to or lower than the increase rate DGx of the anteroposterior deceleration detection value, and thus the processing proceeds to Step S15. In Step S15, the greater of "0" and a value obtained by subtracting "1" from the counter value CNT is derived as the counter value CNT. The processing then proceeds to Step S16. By contrast, in Step S14, when the derived difference DD1 is greater than the second derived difference determination value DDTh2 (NO), it cannot be determined that the increase rate DDVWav of the wheel deceleration average value is equal to or lower than the increase rate DGx of the anteroposterior deceleration detection value, and thus the processing proceeds to Step S16. In this case, the counter value CNT is held. As described above in the present embodiment, update processing of incrementing the counter value CNT when it is determined that the increase rate DDVWav of the wheel deceleration average value is higher than the increase rate DGx of the anteroposterior deceleration detection value, and decrementing the counter value CNT when it is determined that the increase rate DDVWav of the wheel deceleration average value is equal to or lower than the increase rate DGx of the anteroposterior deceleration detection value is performed every predetermined control cycle.

In Step S16, it is determined whether or not the counter value CNT is equal to or greater than a counter determination value CNTTh. The counter determination value CNTTh is a counter value CNT corresponding to the determination time TMcr. As such, in the present embodiment, when the counter value CNT is equal to or greater than the counter determination value CNTTh, it is determined that a slip increase state has been occurring for the determination time TMcr or longer. Then, when it is determined that the counter value CNT is equal to or greater than the counter determination value CNTTh (S16: YES), the processing proceeds to Step S17. In Step S17, a state flag FLG1 is set to ON. That is, the state flag FLG1 is a flag that is set to ON when it is determined that a slip increase state has been occurring for the determination time TMcr or longer, and is set to OFF when it is not determined that a slip increase state has been occurring for the determination time TMcr or longer. Thereafter, the processing routine is temporarily ended.

By contrast, in Step S16, when the counter value CNT is smaller than the counter determination value CNTTh (NO), the processing proceeds to Step S18.

In Step S18, the state flag FLG1 is set to OFF. That is, it is not determined that a slip increase state has been occurring for the determination time TMcr or longer. The processing routine is then temporarily ended.

A case where cascade lock occurs during vehicle braking is described with reference to FIG. 3.

Figure 3A:
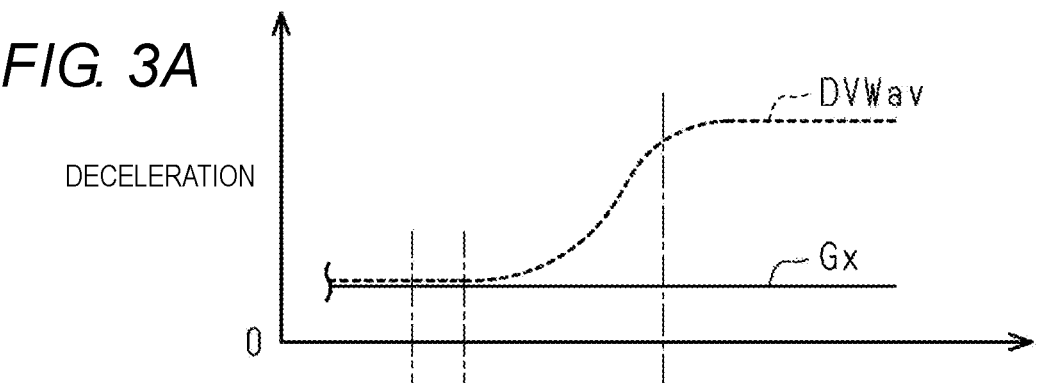
FIGS. 3A, 3B, and 3C are timing charts in a case where cascade lock occurs.
Figure 3B:
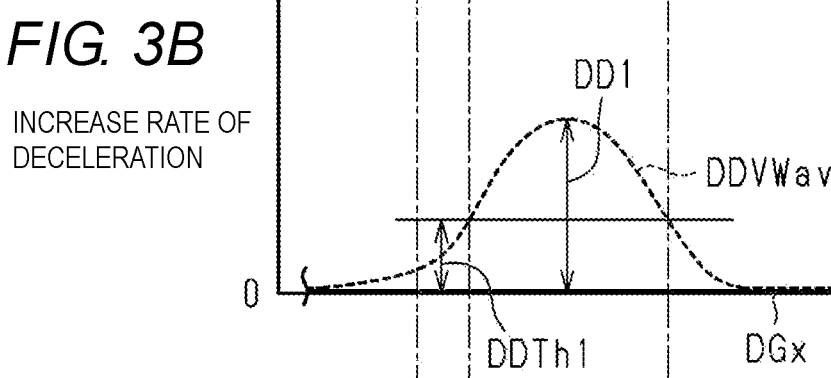
Figure 3C:
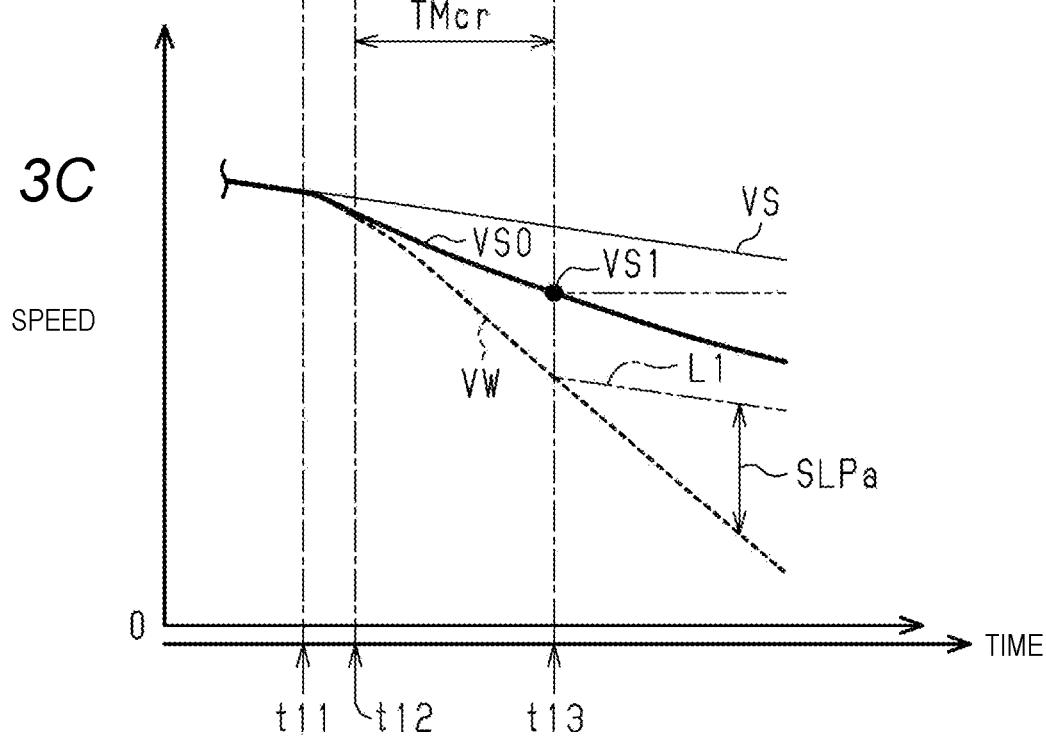

As illustrated in FIGS. 3A, 3B, and 3C, deceleration slip occurs in all the wheels FL, FR, RL, and RR at timing t11 during vehicle braking. Then, although the anteroposterior deceleration detection value Gx hardly changes, the wheel deceleration average value DVWav increases. When cascade lock occurs at this time, the derived difference DD1, which is a value obtained by subtracting the increase rate DGx of the anteroposterior deceleration detection value from the increase rate DDVWav of the wheel deceleration average value, becomes greater than the first derived difference determination value DDTh1 at timing t12.

Here, when deceleration slip occurs only in some of the wheels FL, FR, RL, and RR, since the wheel deceleration of wheels in which deceleration slip does not occur much is small, the increase rate DDVWav of the wheel deceleration average value does not increase much as compared with a case where cascade lock occurs. Therefore, the derived difference DD1 is less likely to be greater than the first derived difference determination value DDTh1 as compared with a case where cascade lock occurs. That is, the counter value CNT is less likely to increase.

Then, since the counter value CNT becomes equal to or greater than the counter determination value CNTTh at timing t13, the determination section 54 determines that a slip increase state has been occurring for the determination time TMcr or longer. The detection section 55 then detects the occurrence of cascade lock.

Note that a noise component is superimposed on the detection signal from the anteroposterior acceleration sensor 103. As such, the anteroposterior deceleration detection value Gx fluctuates due to the superimposition of the noise component. As a result, the increase rate DGx of the anteroposterior deceleration detection value may temporarily become higher than the increase rate DDVWav of the wheel deceleration average value although the vehicle is actually in a slip increase state. A case is considered in which the counter value CNT is reset to "0" when the increase rate DGx of the anteroposterior deceleration detection value temporarily becomes higher than the increase rate DDVWav of the wheel deceleration average value in this manner. In this case, an event in which the counter value CNT is reset to "0" frequently occurs due to the superimposition of the noise component on the detection signal from the anteroposterior acceleration sensor 103, and the counter value CNT may be delayed in becoming the counter determination value CNTTh or greater. That is, detection of the occurrence of cascade lock may be delayed.

In this regard, in the present embodiment, the counter value CNT is decremented by only "1" every control cycle in a period in which the derived difference DD1 is equal to or smaller than the second derived difference determination value DDTh2. As such, in a case where a state in which the derived difference DD1 is equal to or smaller than the second derived difference determination value DDTh2 is temporary, incrementing of the counter value CNT is resumed at a time when the derived difference DD1 becomes greater than the first derived difference determination value DDTh1. As a result, it is possible to suppress a delay in the counter value CNT becoming equal to or greater than the counter determination value CNTTh. That is, a delay in detection of the occurrence of cascade lock can be suppressed.

Figure 4:
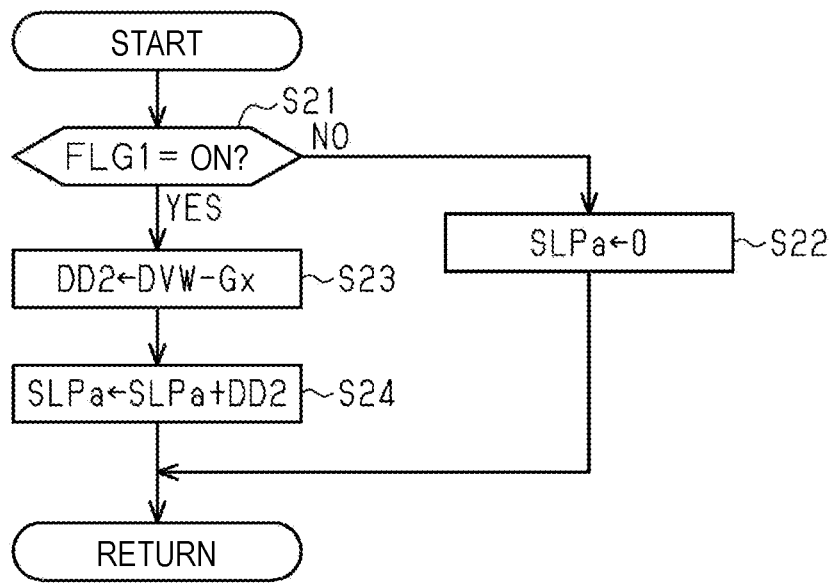
FIG. 4 is a flowchart for describing one processing routine performed by the braking control device.

Next, a processing routine performed by the slip amount deriving section 56 to derive slip amounts SLPa of the wheels FL, FR, RL, and RR is described with reference to FIG. 4. The processing routine is repeatedly performed every predetermined control cycle.

In Step S21 of the processing routine, it is determined whether or not the state flag FLG1 is set to ON. When the state flag FLG1 is set to OFF (S21: NO), it can be determined that the occurrence of cascade lock has not been detected, and thus the processing proceeds to Step S22. In Step S22, "0" is derived as the slip amounts SLPa of the wheels FL, FR, RL, and RR. Thereafter, the processing routine is temporarily ended.

By contrast, when the state flag FLG1 is set to ON (YES) in Step S21, the processing proceeds to Step S23. In Step S23, values obtained by subtracting the anteroposterior deceleration detection value Gx from the wheel deceleration calculation values DVW of the wheels FL, FR, RL, and RR are derived as derived differences DD2. Subsequently, in the Step S24, sums of the previous values of the slip amounts SLPa and the derived differences DD2 are derived as the slip amounts SLPa of the wheels FL, FR, RL, and RR. That is, after the occurrence of cascade lock is detected, the differences between the wheel deceleration calculation values DVW and the anteroposterior deceleration detection value Gx are integrated, and the integrated values are derived as the slip amounts SLPa of the wheels FL, FR, RL, and RR. When a slip amount SLPa is derived for each of the wheels FL, FR, RL, and RR in this manner, the processing routine is temporarily ended.

A line L1 indicated by a dashed and dotted line in FIG. 3C is a transition of a state quantity based on the wheel speed detection values VW of the wheels FL, FR, RL, and RR and the anteroposterior deceleration detection value Gx at timing t13 at which the occurrence of cascade lock is detected. When the wheel speed detection values VW of the wheels FL, FR, RL, and RR at timing t13 are set as a first state quantity, this state quantity decreases from the first state quantity at a rate corresponding to the anteroposterior deceleration detection value Gx. The difference between this state quantity and the wheel speed detection values VW corresponds to the slip amount SLPa.

Figure 5:
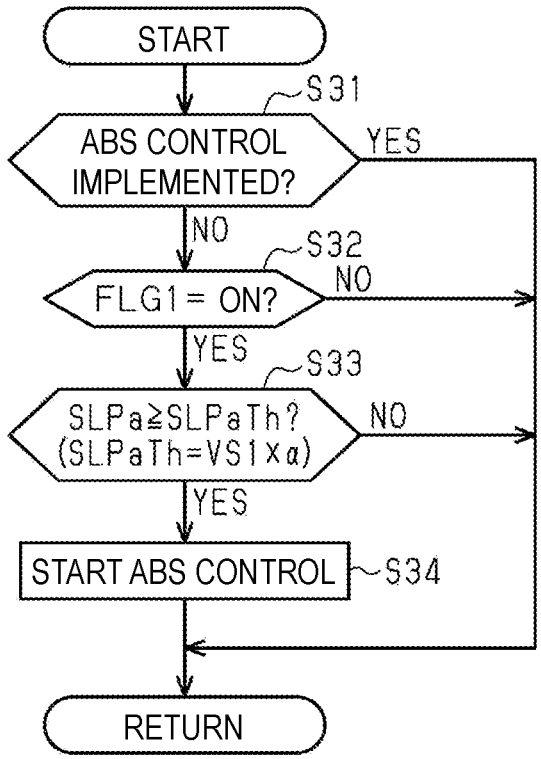
FIG. 5 is a flowchart for describing one processing routine performed by the braking control device.

Next, a processing routine performed by the ABS controller 57 to determine to start ABS control under a situation where the occurrence of cascade lock is detected is described with reference to FIG. 5. The processing routine is repeatedly performed for each of the wheels FL, FR, RL, and RR. Here, a case where ABS control is determined to be started on the front left wheel FL is described as an example.

In Step S31 of the processing routine, it is determined whether or not ABS control is being implemented on the front left wheel FL. When ABS control is being implemented on the front left wheel FL (S31: YES), the processing routine is temporarily ended. When ABS control is not being implemented on the front left wheel FL by contrast (S31: NO), the processing proceeds to the Step S32 regardless of whether or not ABS control is being performed on wheels other than the front left wheel FL.

In Step S32, it is determined whether or not the state flag FLG1 is set to ON. When the state flag FLG1 is set to OFF (S32: NO), the occurrence of cascade lock has not been detected, and thus the processing routine is temporarily ended. When the state flag FLG1 is set to ON by contrast (S32: YES), the occurrence of cascade lock has been detected, and thus the processing proceeds to Step S33.

In Step S33, it is determined whether or not the slip amount SLPa of the front left wheel FL is greater than or equal to a slip amount determination value SLPaTh. The slip amount determination value SLPaTh is a value for determining whether or not to start ABS control based on the slip amount SLPa. In the present embodiment, the product of a detection time vehicle body speed VS1 and a coefficient α is set as the slip amount determination value SLPaTh. The detection time vehicle body speed VS1 is an estimated vehicle body speed VS0 at the time of detection of the occurrence of cascade lock. That is, in the example shown in FIG. 3, the estimated vehicle body speed VS0 at timing t13 is the detection time vehicle body speed VS1. A value greater than "0" and smaller than "1" is set as the coefficient α. Favorably, a value greater than "0.1" and smaller than "0.2" is set as the coefficient α.

In Step S33, when the slip amount SLPa of the front left wheel FL is smaller than the slip amount determination value SLPaTh (NO), the processing routine is temporarily ended. That is, ABS control is not started on the front left wheel FL. When the slip amount SLPa is equal to or greater than the slip amount determination value SLPaTh by contrast (S33: YES), the processing proceeds to Step S34. In Step S34, ABS control is started on the front left wheel FL. Thereafter, the processing routine is temporarily ended.

The flow of processing in a case where ABS control is determined to be started on a wheel other than the front left wheel FL is the same as that in the case of the front left wheel FL, and thus detailed description is omitted.

When the occurrence of cascade lock is not detected, ABS control is started when a slip amount SLP, which is a difference between the estimated vehicle body speed VS0 and a wheel speed detection value VW, becomes equal to or greater than a determination value.

Next, actions and effects of the present embodiment are described with reference to FIG. 6.

As illustrated in FIGS. 6A, 6B, and 6C, when cascade lock occurs at the time of vehicle braking, the wheel speed detection values VW rapidly decrease in all the wheels FL, FR, RL, and RR. In such a case, the estimated vehicle body speed VS0 derived based on the wheel speed detection values VW becomes lower than the actual vehicle body speed VS.

From timing t21 in the example illustrated in FIG. 6, the derived difference DD1, which is a value obtained by subtracting the increase rate DGx of the anteroposterior deceleration detection value from the increase rate DDV-Wav of the wheel deceleration average value, becomes greater than the first derived difference determination value DDTh1. That is, a slip increase state is determined. At timing t22, it is then determined that the slip increase state has been occurring for the determination time TMcr or longer. As a result, in the present embodiment, the occurrence of cascade lock can be detected during vehicle braking.

Then, from timing t22 onward, the derived differences DD2, which are differences between the wheel deceleration calculation values DVW and the anteroposterior deceleration detection value Gx, are derived every predetermined control cycle, and integrated values of the derived differences DD2 are derived as the slip amounts SLPa. When the degree of deceleration slip of the wheels FL, FR, RL, and RR increases, the wheel speed detection values VW decrease, and thus the slip amounts SLPa increase. Then, since the slip amounts SLPa become equal to or greater than the slip amount determination value SLPaTh at timing t23, ABS control is implemented on the wheels in which the slip amounts SLPa become equal to or greater than the slip amount determination value SLPaTh.

That is, in the present embodiment, even when cascade lock occurs, the slip amounts SLPa that change according to the degree of deceleration slip of the wheels FL, FR, RL, and RR can be derived. When cascade lock is occurring as illustrated in FIG. 6C, the estimated vehicle body speed VS0 is much lower than the actual vehicle body speed VS, so that the slip amounts SLP, which are differences between the estimated vehicle body speed VS0 and the wheel speed detection values VW, are less likely to increase even when the degree of deceleration slip of the wheels FL, FR, RL, and RR increases. Therefore, by using the slip amounts SLPa instead of the slip amounts SLP, the degree of deceleration slip of the wheels FL, FR, RL, and RR can be appropriately estimated, and ABS control can be started.

When cascade lock occurs, the deviation between the estimated vehicle body speed VS0 and the actual vehicle body speed VS is great. As such, a slip amount determination value SLPaTh is adopted as a determination value for determining the start timing of ABS control. The slip amount determination value SLPaTh is equal to the product of the detection time vehicle body speed VS1 and the coefficient α. As such, by setting an appropriate value as the coefficient α, a delayed start or an early start of ABS control can be suppressed.

When ABS control is started as described above, deceleration slip of the wheels FL, FR, RL, and RR is eliminated, and thus the deviation between the estimated vehicle body speed VS0 and the actual vehicle body speed VS is eliminated. As a result, derivation accuracy of the slip amounts SLP of the wheels FL, FR, RL, and RR increases. As a result, the braking force of the wheels FL, FR, RL, and RR can be adjusted based on the slip amounts SLP.

The present embodiment can be implemented with the following modifications. The present embodiment and the following modification examples can be implemented in combination with each other within a scope that is not technically contradictory.

A value differing from the product of the detection time vehicle body speed VS1 and the coefficient α may be set as the slip amount determination value SLPaTh. For example, a value obtained by subtracting a predetermined correction value from the detection time vehicle body speed VS1 may be set as the slip amount determination value SLPaTh.

The slip amount determination value SLPaTh may be fixed to a predetermined value set in advance.

In a case where the occurrence of cascade lock is detected, when a slip amount SLPa continues to increase for a specified time or more, it may be determined that the slip amount SLPa is increasing and ABS control may be started.

The second derived difference determination value DDTh2 may be equal to the first derived difference determination value DDTh1.

Figure 2:
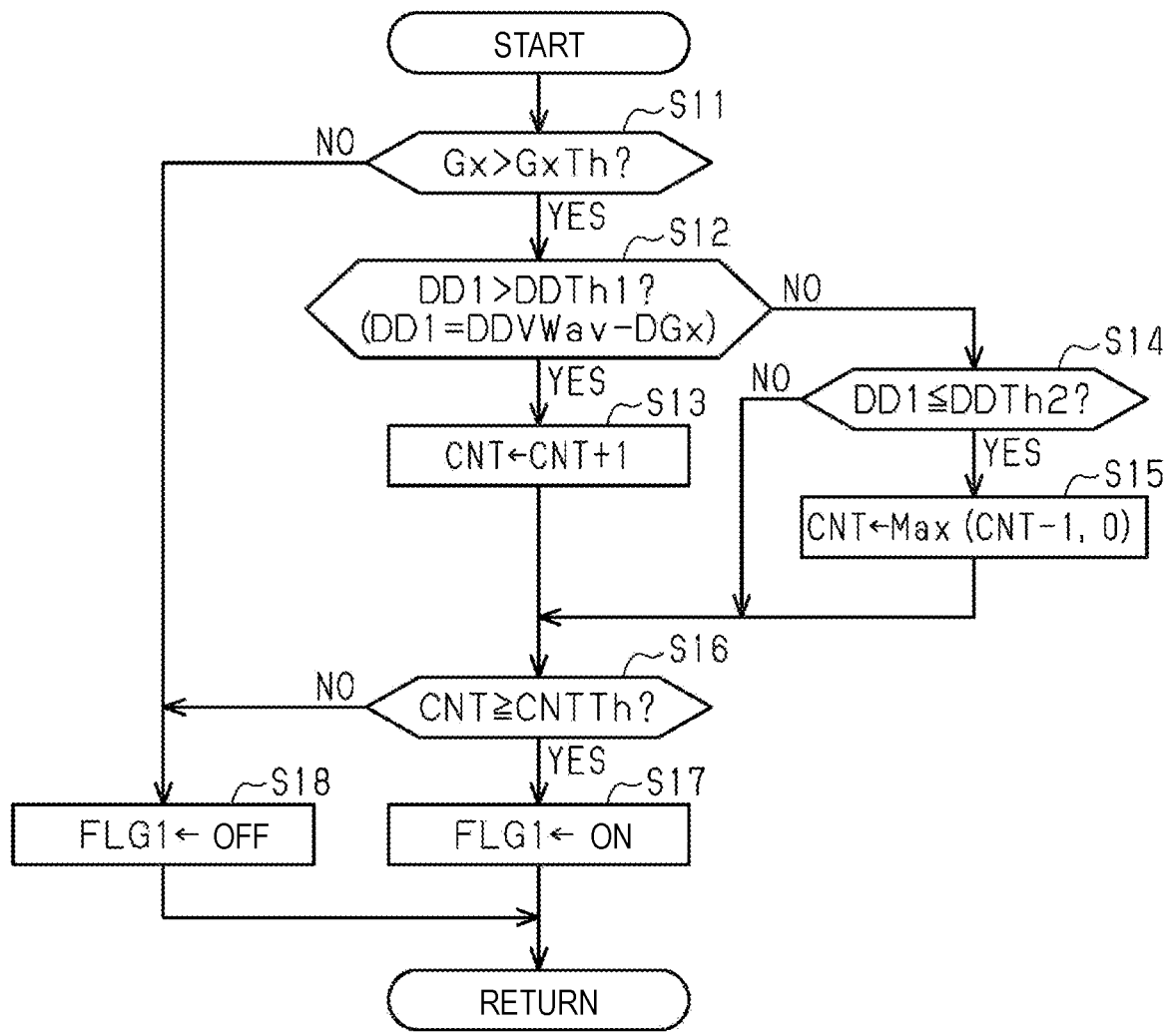
FIG. 2 is a flowchart for describing one processing routine performed by the braking control device.

As illustrated in FIG. 2 in the above embodiment, when the derived difference DD1, which is the difference between the increase rate DDVWav of the wheel deceleration average value and the increase rate DGx of the anteroposterior deceleration detection value, is equal to or smaller than the second derived difference determination value DDTh2, the counter value CNT is decremented. However, when the derived difference DD1 is equal to or smaller than the second derived difference determination value DDTh2, the counter value CNT may be held. In this case, when a state in which the derived difference DD1 is smaller than the second derived difference determination value DDTh2 continues for a predetermined time or more, the counter value CNT is preferably reset to "0".

The counter value CNT may be incremented every predetermined control cycle from a time when the derived difference DD1 becomes greater than the first derived difference determination value DDTh1 until a time when the derived difference DD1 becomes equal to or smaller than the second derived difference determination value DDTh2. Furthermore, the counter value CNT may be decremented every predetermined control cycle from a time when the derived difference DD1 becomes equal to or smaller than the second derived difference determination value DDTh2 until a time when the derived difference DD1 becomes greater than the first derived difference determination value DDTh1.

In the above embodiment, after the occurrence of cascade lock is detected, ABS control is implemented on the wheels FL, FR, RL, and RR in which the slip amounts SLPa are increased. However, when cascade lock occurs, a predetermined deceleration slip occurs in all the wheels FL, FR, RL, and RR. As such, ABS control may be started on all the wheels FL, FR, RL, and RR at the timing when the occurrence of cascade lock is detected. In this case, as compared with the case of the above embodiment, the determination time TMcr may be lengthened, that is, the counter determination value CNTTh may be increased.

The braking control device 50 may be configured as a circuit including one or more processors operating according to a computer program, one or more dedicated hardware circuits such as dedicated hardware for performing at least some of various processing, or a combination thereof. Examples of the dedicated hardware include an application specific integrated circuit (ASIC). A processor includes a central processing unit (CPU) and a memory such as a random-access memory (RAM) and a read-only memory (ROM), and the memory stores program codes or commands configured to cause the CPU to perform processing. The memory, that is, a storage medium, includes any available medium that can be accessed by a general-purpose or dedicated computer.

The invention claimed is:

1. A vehicle braking control device for application to a vehicle including a plurality of wheels, a plurality of wheel speed sensors each of which outputs a detection signal according to a wheel speed that is a speed of a corresponding wheel, and an anteroposterior acceleration sensor that outputs a detection signal according to an anteroposterior acceleration of the vehicle, the vehicle braking control device comprising:
a wheel deceleration deriving section configured to, assuming that a deceleration of the vehicle in an anteroposterior direction derived based on the detection signal of the anteroposterior acceleration sensor is an anteroposterior deceleration detection value, decrease rates of the wheel speeds are wheel decelerations, and wheel speeds derived based on the detection signals of the wheel speed sensors are wheel speed detection values, derive decrease rates of the wheel speed detection values as wheel deceleration calculation values;
an average value deriving section configured to derive an average value of the wheel deceleration calculation values of the wheels as a wheel deceleration average value;
a determination section configured to determine, based on the wheel deceleration average value and the anteroposterior deceleration detection value, whether or not a slip increase state, in which an increase rate of the average value of the wheel decelerations of the respective wheels is higher than an increase rate of the deceleration of the vehicle in the anteroposterior direction, has been occurring for a determination time or longer; and
a detection section configured to detect occurrence of cascade lock, in which a predetermined deceleration slip occurs in all drive wheels of the vehicle, when it is determined that the slip increase state has been occurring for the determination time or longer during vehicle braking, wherein
the determination section
performs, every predetermined control cycle, update processing of incrementing a counter value when it is determined that the increase rate of the wheel deceleration average value is higher than the increase rate of the anteroposterior deceleration detection value, and decrementing the counter value when it is determined that the increase rate of the wheel deceleration average value is equal to or lower than the increase rate of the anteroposterior deceleration detection value, and
when the counter value becomes equal to or greater than a counter determination value, determines that the slip increase state has been occurring for the determination time or longer, and
in the update processing, the determination section
determines, when a deviation, which is a value obtained by subtracting the increase rate of the anteroposterior deceleration detection value from the increase rate of the wheel deceleration average value, is greater than a first derived difference determination value of "0" or greater, that the increase rate of the wheel deceleration average value is higher than the increase rate of the anteroposterior deceleration detection value, and
when the deviation is equal to or smaller than a second derived difference determination value equal to or smaller than the first derived difference determination value, determines that the increase rate of the wheel deceleration average value is equal to or lower than the increase rate of the anteroposterior deceleration detection value.

2. The vehicle braking control device according to claim 1, further comprising:
a slip amount deriving section configured to integrate differences between the wheel deceleration calculation values and the anteroposterior deceleration detection value and derives the integrated values as slip amounts of the wheels after occurrence of cascade lock is detected; and
an ABS controller configured to start anti-lock brake control for suppressing deceleration slip of the wheels through adjustment of braking force of the wheels on a condition that the slip amounts increase after occurrence of cascade lock is detected.

3. The vehicle braking control device according to claim 2, further comprising
a vehicle body speed deriving section configured to derive an estimated vehicle body speed of the vehicle based on the wheel speed detection value of at least one of the wheels, wherein
in a case where the estimated vehicle body speed when occurrence of cascade lock is detected is set as a detection time vehicle body speed,
the ABS controller starts the anti-lock brake control when the slip amounts are equal to or greater than a product of the detection time vehicle body speed and a coefficient.

4. A vehicle braking control device for application to a vehicle including a plurality of wheels, a plurality of wheel speed sensors each of which outputs a detection signal according to a wheel speed that is a speed of a corresponding wheel, and an anteroposterior acceleration sensor that outputs a detection signal according to an anteroposterior acceleration of the vehicle, the vehicle braking control device comprising:
a wheel deceleration deriving section configured to, assuming that a deceleration of the vehicle in an anteroposterior direction derived based on the detection signal of the anteroposterior acceleration sensor is an anteroposterior deceleration detection value, decrease rates of the wheel speeds are wheel decelerations, and wheel speeds derived based on the detection signals of the wheel speed sensors are wheel speed detection values, derive decrease rates of the wheel speed detection values as wheel deceleration calculation values;
an average value deriving section configured to derive an average value of the wheel deceleration calculation values of the wheels as a wheel deceleration average value;
a determination section configured to determine, based on the wheel deceleration average value and the anteroposterior deceleration detection value, whether or not a slip increase state, in which an increase rate of the average value of the wheel decelerations of the respective wheels is higher than an increase rate of the deceleration of the vehicle in the anteroposterior direction, has been occurring for a determination time or longer; and
a detection section configured to detect occurrence of cascade lock when it is determined that the slip increase state has been occurring for the determination time or longer during vehicle braking;
wherein the determination section performs, every predetermined control cycle, update processing of incrementing a counter value when it is determined that the increase rate of the wheel deceleration average value is higher than the increase rate of the anteroposterior deceleration detection value, and decrementing the counter value when it is determined that the increase rate of the wheel deceleration average value is equal to or lower than the increase rate of the anteroposterior deceleration detection value, and
when the counter value becomes equal to or greater than a counter determination value, determines that the slip increase state has been occurring for the determination time or longer;
wherein in the update processing, the determination section determines, when a deviation, which is a value obtained by subtracting the increase rate of the anteroposterior deceleration detection value from the increase rate of the wheel deceleration average value, is greater than a first derived difference determination value of "0" or greater, that the increase rate of the wheel deceleration average value is higher than the increase rate of the anteroposterior deceleration detection value, and
when the deviation is equal to or smaller than a second derived difference determination value equal to or smaller than the first derived difference determination value, determines that the increase rate of the wheel deceleration average value is equal to or lower than the increase rate of the anteroposterior deceleration detection value.

* * * * *